US00RE37957E

(19) United States
(12) Reissued Patent
Garfield

(10) Patent Number: US RE37,957 E
(45) Date of Reissued Patent: Jan. 7, 2003

(54) TRADING CARD GAME METHOD OF PLAY

(75) Inventor: Richard Channing Garfield, Portland, OR (US)

(73) Assignee: Wizards of the Coast, Inc., Renton, WA (US)

(21) Appl. No.: 09/343,052

(22) Filed: Jun. 29, 1999

Related U.S. Patent Documents

Reissue of:
(64) Patent No.: 5,662,332
Issued: Sep. 2, 1997
Appl. No.: 08/544,306
Filed: Oct. 17, 1995

U.S. Applications:
(

(62) Division of application No. 08/263,447, filed on Jun. 22, 1994.

(51) Int. Cl.[7] ..... A63F 1/00
(52) U.S. Cl. ..... 273/308; 273/259; 273/277
(58) Field of Search ..... 273/244, 245, 273/246, 247, 259, 277, 292, 298, 308

(56) References Cited

U.S. PATENT DOCUMENTS

| | | | |
|---|---|---|---|
| D59,527 | S | 10/1921 | Stickney |
| 4,299,637 | A | 11/1981 | Oberdeck et al. |
| 4,325,556 | A | 4/1982 | DeCanto et al. |
| 4,398,708 | A | 8/1983 | Goldman et al. |
| 4,437,670 | A | 3/1984 | Simon |

(List continued on next page.)

FOREIGN PATENT DOCUMENTS

EP 0 497 223 A1 8/1992

OTHER PUBLICATIONS

Scott Kelnhofer (ed.), *Sports Cards,* Issue 96, vol. 13, No. 8, pp. 43, 45, 64–65, Aug. 1993.

"Rules of play and strategy hints for: *COSMIC ENCOUNTER*® The Science Fiction game for everyone," EON Products, Inc., Barre, Massachusetts, 1983, 8 pages.

"Instructions for Strat–O–Matic Pro Basketball, Basic Version", Strat–O–Matic Game Co., Inc., Glen Head New York 1981, 16 pages.

"How to Play Strat–O–Matic Baseball," Strat–O–Matic Game Company, Inc., 1998, (believed to be similar to other versions dated prior to 1993), 16 pages.

Priestly, Rick et al., "Warhammer Battle Magic," Game Workshop Ltd., England 1992, 66 pages.

Carver, Derek, "The Rules, Warrior Knights," Games Workshop Ltd., England 1985, 12 pages.

*Primary Examiner*—Benjamin H. Layno
*Assistant Examiner*—V K Mendiratta
(74) *Attorney, Agent, or Firm*—Perkins Coie LLP

(57) ABSTRACT

Provided herein is a novel method of game play and game components that in one embodiment are in the form of trading cards (10, 12, 40, 42, 44, 48, 54, 60, 64). However, the game components may take other forms, such as a board game, or the game may be played in different media, such as electronic games, video games, computer games, and interactive network. In one version, the game components comprise energy or mana cards 40 and command or spell cards (10, 12, 42, 44, 48, 54, 60, 64) having command or spells associated therewith that utilize the energy to enable a player to attack, defend and modify the effect of other mana cards, spell cards, and the fundamental rules of play. The goal of the game is to reduce the life points of other players to a level below one. In this game of strategy and chance, players construct their own library of cards, preferably from trading cards, and play their library or deck of cards against the deck of cards of an opposing player. Cards may be obtained from retail outlets, trading with other players or collectors, and winning cards at games and tournaments.

54 Claims, 6 Drawing Sheets

U.S. PATENT DOCUMENTS 4,486,022 A * 12/1984 Dixon
4,634,125 A 1/1987 Seklecki
4,858,123 A 8/1989 Alexoff et al.
4,979,750 A * 12/1990 Endrody
5,037,101 A 8/1991 McNulty
5,071,136 A * 12/1991 Lott
5,137,278 A 8/1992 Schilling et al.
5,145,173 A * 9/1992 Crowder
5,149,093 A 9/1992 Schilling et al.
5,190,285 A 3/1993 Levy et al.
5,201,525 A * 4/1993 Castro
5,215,792 A 6/1993 Miller
5,282,651 A 2/1994 Alonso
5,287,641 A 2/1994 Showers
5,356,293 A 10/1994 Mizglewski
5,377,975 A 1/1995 Clapper, Jr.
5,407,204 A 4/1995 Meyer, III
5,411,259 A 5/1995 Pearson et al.
5,433,035 A 7/1995 Bauer
5,435,568 A 7/1995 Black
5,443,270 A 8/1995 Loritz
5,480,156 A 1/1996 Doederlein et al.
5,533,124 A 7/1996 Smith et al.
5,588,678 A 12/1996 Young
5,641,164 A 6/1997 Doederlein et al.
5,689,561 A 11/1997 Pace
5,743,801 A 4/1998 Welander
5,748,731 A 5/1998 Shepherd
5,782,023 A 7/1998 Iannantuano et al.
5,836,585 A 11/1998 LaCivita
5,841,878 A 11/1998 Arnold et al.
5,855,001 A 12/1998 Doederlien et al.
5,938,199 A 8/1999 Doederlein et al.
5,982,736 A 11/1999 Pierson
6,179,294 B1 * 1/2001 Turnali

* cited by examiner

TRADING CARD GAME METHOD OF PLAY

Matter enclosed in heavy brackets [ ] appears in the original patent but forms no part of this reissue specification; matter printed in italics indicates the additions made by reissue.

This application is a division of pending application Ser. No. 08/263,447 filed Jun. 22, 1994.

TECHNICAL FIELD

The present invention pertains generally to games that combine chance and strategy, and, more particularly, to a card game that utilize trading cards and to a method of playing the game, as well as alternative embodiments of the same, including different game formats such as electronic games, interactive networks, computer software, board games, and role playing games.

BACKGROUND OF THE INVENTION

Trading cards are a well-known method of disbursing and collecting information about public figures. A familiar type of trading card is the baseball card that has a photographic depiction of an athlete along with biological and statistical information about the athlete. These baseball cards and other cards dealing with various sports figures are used by sports enthusiasts for gathering information about players and teams. Trading cards have also been developed in other areas, such as the entertainment industry, which depict music performers and television and movie personalities.

Trading cards are typically exchanged among enthusiasts to obtain cards that are needed to complete a set of related cards to collect cards that are not readily available. Collectors buy and sell these cards for their economic and historic value. The cards themselves have varying monetary values, depending on the popularity of the individual depicted thereon and the availability of each card, some being more common than others. Such cards are typically sold through retail game stores and other specialty outlets.

Playing cards, on the other hand, especially the well-known fifty-two deck face cards, are easily and readily available. The cards themselves, individually and collectively, generally have no value other than for amusement. Many different games can be played with a single deck of playing cards, limited generally by the imagination of the players. Some card games require cards especially printed for that game, and these cards have little value outside the playing of that particular game.

Many games played with the more common face cards are games of chance. In other words, these games have rules that require either the random selection of cards or depend on the occurrence of events outside the control of the players. Other games that require some strategy usually limit the level of strategy with restrictive rules of play.

At the present, there are no known games that use freely tradable game elements or components, such as trading cards, and further, games that enable a player to form a unique combination of components that competes against the combinations of other players.

SUMMARY OF THE INVENTION

In one form, the present invention is directed to a game for two or more players. The game components include rules of play and a plurality of game elements, one or more of the game elements having limited availability to the players, the game elements being freely tradable among the players such that each player obtains and constructs their own set of game elements to thereby compete against the set of game elements of other players. The game can also include articles or a method for tracking a life value assigned to each player so players know when life value has been reduced to zero, thereby eliminating the player from the game.

In accordance with another form of the present invention the game is directed to a plurality of game elements, the plurality of game elements further comprising multiple copies of unique individual game elements, with one or more of the unique individual game elements having fewer copies than the other unique individual game elements. Ideally the game elements are freely tradable among players such that each player obtains and constructs their own set of game elements to thereby complete against the set of game elements of other players. This form of the game can also include articles or a method of tracking the life value, such as counters, to enable a player to determine when the player's life value has reached zero and the player is eliminated from the game.

In accordance with another aspect of the present invention, the game elements comprise one or more state-altering elements that enable a player to alter the state of the game elements, the rules of play, and any player. The game elements can also include one or more defense elements that defend against a state-altering element. State-altering effects include modifying the effect of other game elements and rules, and also reducing a players life value, requiring elimination of other game elements, and suspension of one or more rules of play.

In accordance with another aspect of the present invention, the game elements comprise hand-holdable cards.

In another form, the present invention is further directed to a game for two or more players comprising energy elements and command elements, with the command elements having commands associated therewith that utilize the energy elements to effectuate the commands, thereby enabling a player to change the state of and defeat other players. The command elements further include one or more attack elements that enable a player to change the state of the energy elements; the command elements, and any other player, such as reducing a player's life value, eliminating command or energy elements, or modifying the effect of game elements and rules. Preferably, the command elements also include one or more defense elements that enable a player to defend against an attack on the player, the energy elements, and the command elements. The defense elements can be a component of the attack elements.

In accordance with another embodiment of the present invention, the game includes rules of play, and the command elements also include one or more commands that enable a player to alter one or more rules of play. In addition, the command elements include one or more effect commands that enable a player to alter the effect of the energy elements, the command elements, and the rules of play. The effect commands can alter the effect of the energy elements, the command elements, and the rules of play for the entire game or for only a potion of the time the game is being played.

In accordance with another aspect of the present invention, the energy elements and the command elements are in the form of hand-holdable cards that comprise command cards having one or more commands associated therewith and energy cards. The command cards include one or more cards having commands that enable a player to attack energy cards, command cards, and any player to thereby inflict damage and defeat opposing players. The attack command cards may enable a player to defend against attack.

In accordance with another aspect of the present invention, the command cards include one or more cards having commands that enable a player to alter the effect of energy cards and command cards, to alter or modify one or more rules of play and the state of a player, or to provide energy.

In accordance with a further aspect of the present invention, the energy cards have a playing face with indicia thereon indicating the level of energy provided by the energy card. In addition, one or more of the command cards includes indicia of the level of energy required to effectuate a command associated therewith. In addition, the energy cards may be comprised of a plurality of different types of energy cards, with the type of energy provided by each card being indicated by indicia thereon. The indicia may include symbols, words, numbers, or a color scheme. The one or more command cards may themselves require energy to be put into play, and the amount and type of energy required is indicated on the command card with symbols, words, numbers, a design or a color scheme that matches the indicia on the corresponding energy card.

In accordance with still yet another aspect of the present invention, the command cards include a plurality of attack cards that enable a player to alter the state of other attack cards or other players, each attack card having on the face thereof indicia indicating the level of energy required as well as the type of energy required to bring each of the attack cards into play. Indicia are also included that indicate the manner in which the card changes the state of other cards and players and the level of damage inflicted by the attack card. The attack cards may also include the ability to enable a player to defined against attack, which is shown by indicia on the playing face of the attack card indicating the level of defense that is provided.

In accordance with yet a further aspect of the present invention, the command cards also include a plurality of effect cards that enable a player to modify the effect of energy cards and command cards, and to modify the rules of play, as well as to alter the state of or inflict damage and destruction on other energy cards, command cards, and players, each of the effect cards having indicia on the playing face thereof indicating the effect brought into play, the level of damage inflicted and defense provided, as well as the level and type of energy required, if any.

In accordance with another aspect of the present invention, the game includes electronic devices for visually displaying the energy elements and the command elements and for enabling players to manipulate the energy elements and the command elements during play. Ideally, the electronic devices include communication devices to enable each player to communicate with other players.

In accordance with a further aspect of the present invention, a game is provided for two or more players that comprises an energy means; means for enabling a player to resist state-altering effects, damage and destruction, the resistance means having a level of resistance associated therewith that, when depleted, no longer enables a player to resist damage and destruction and is therefore out of the game; means for enabling a player to prevent depletion of the level of resistance of the players' resistance means; means for enabling a player to deplete the level of resistance of other players' resistance means, the resistance depleting means requiring consumption of a predetermined amount of the energy means; rule means for conducting the course of play; and means for enabling a player to alter the rule means. The game can further include means for enabling a player to damage and disable the resistance depleting means of other players. Furthermore, the game can include rule altering means that requires consumption of a predetermined amount of energy to enable a player to alter or modify the rules of play. Finally, the game can also include a life means of a predetermined amount assigned to each player to enable each player to survive a predetermined amount of state-altering effects and damage.

In accordance with another aspect of the present invention, a game is provided for one or more players that comprises rules of play; a plurality of hand-holdable cards, each of the cards having a playing face, the cards further comprising mana cards that provide energy and spell cards that enable a player to attack, defend, and to alter the state of or effect of one or more of the mana cards, the spell cards, and the rules of play.

In accordance with another aspect of the before-mentioned invention, the game further includes means for indicating a life level for each player, the life level enabling a player to survive a predetermined amount of state-altering effects and damage.

In accordance with another aspect of the before-mentioned invention, one or more of the spell cards include creature cards that enable a player to attack and inflict damage and destruction on other creature cards and any player, and that further enable a player to defend against attack. The mana cards further include indicia indicating the type of energy provided and the level or amount of energy provided. The spell cards can further include enchantment cards that permanently modify the effect of mana cards, spell cards, and the rules of play. These enchant cards require a single type of mana in order to be brought into play.

In accordance with another aspect of the before-mentioned game, the spell cards include artifact cards that enable a player to permanently modify the effect of mana cards, spell cards, and the rules of play. Artifact cards can use any type of mana to be brought into play.

In accordance with another aspect of the before-mentioned invention, the spell cards include sorcery cards that enable a player only during the player's turn to modify the effect of mana cards, spell cards, and the rules of play with the effect of the sorcery card lasting on a temporary basis only, ideally during the player's turn, after which the effect of the sorcery card ceases.

In accordance with still yet another aspect of the before-mentioned invention, the spell cards include instant cards that enable a player at any time to temporarily modify the effect of the mana cards, spell cards, and the rules of play. Furthermore the spell cards can also include interrupt cards that enable a player at any time to permanently modify the effect of mana cards, spell cards, and the rules of play.

In accordance with a further aspect to the present invention, the spell cards include creature cards that enable a player to permanently introduce into play a creature that then enables a player to attack any player, as well as to enable a player to defend against attack.

The present invention is also directed to a method a playing a game, wherein the game components comprise energy elements and command elements having commands associated therewith that utilize the energy elements to effectuate the commands, thereby enabling the player to inflict damage and destruction on the opposing players, the method of play for each player comprising the steps of constructing a library of command elements and energy elements; obtaining an opening hand of a predetermined number of energy elements and command elements from the library; executing a turn to enter one or more energy elements into play and effectuating one or more commands associated with the command elements as the level of energy components permits to thereby attack and defend against one or more opposing players.

In accordance with another aspect of the beforementioned invention, the steps of executing a turn include the sub-steps of tapping the energy elements when used by a command element, the sub-step of tapping comprises flagging the energy elements so all players can see the energy element is being used. In addition, the step of executing a turn further includes the step of untapping an energy element by unflagging the energy element so that all players can see the energy element is available for use.

In accordance with another aspect of the present invention, the steps of executing a turn further include the steps of untapping all tapped energy elements as permitted by the command elements presently in effect and effectuating any command elements permitted during this phase of play; unkeeping an account of all damage and effects inflicted during the untap phase and the upkeep phase, and effectuating any command elements permitted during this phase; obtaining an additional element randomly selected from the library of command elements and energy elements; entering one or more energy elements into play and entering one or more command elements into play as the level of energy elements permits to enable a player to attack other energy elements, command elements, and other players, to defend against such attack, and to modify the effect of energy elements, command elements, and the rules of play and alter the state of a player; discarding one or more elements until the predetermined level of elements is reached, and effectuating any command elements permitted during this phase; announcing to opposing players that the turn is finished, and effectuating any command elements permitted during this phase.

In accordance with another aspect of the present invention, one or more of the command elements may also require tapping to effectuate the commands thereon.

In accordance with further embodiments of the present invention, a method of playing a game for two or more players is provided, the game components comprising rules or play and freely tradable elements having state-altering effects associated therewith, the method of playing the game for each player comprising the steps of constructing a library of freely-tradable elements; obtaining an opening hand of a predetermined number of randomly selected elements from the library of elements; executing a turn to bring into play one or more state-altering elements to thereby enable a player to attack and defend against attack, and to modify the effect of one or more elements, and rules of play, and alter the state of the one or more elements and any player.

In accordance with another aspect of the beforementioned invention, the steps of executing a turn comprise the steps of tapping an element in play by flagging it so all players can see the element is presently in use and untapping the element by unflagging the element so that all players can see the element is available for use.

In accordance with another aspect of the present invention, the steps of executing a turn including the steps of first untapping all previously-tapped elements and using any elements permitted during this phase; drawing an element from the library of elements; entering one or more elements into play to effectuate a state-altering effect associated with the element that enables a player to attack other elements and any player, to defend against such attack, and to modify the effect of any element and rules of play, and alter the state of any element and any player; tapping all elements used to bring the effect into play; discarding elements as necessary until the level of predetermined number of elements is reached; and announcing to all players that a turn is over.

In accordance with another aspect of the present invention, the method further includes each player utilizing electronic means to visually display elements, manipulate the elements, and execute turns and to communicate with other players.

The present invention further contemplates a method of playing a trading card game, the game components comprising a reservoir of trading cards that includes mana cards for providing energy and spell cards having spells associated therewith that utilize a predetermined level of energy or mana to enable a player to attack other mana cards, spell cards, and any player, to defend against such attack, and to enable a player to modify the effect of a mana card, spell card, and the rules of play, and to alter the state of any card and any player, with a portion of the spell cards and mana cards having a limited availability such that there are rare and uncommon cards in the reservoir of mana card and spell cards made available to players, the game components further including rules of play and a level of life for each player to enable a player to survive a predetermined level of damage; the method of playing the game for each player comprising the steps of compiling a pool of mana cards and spell cards from the reservoir of mana cards and spell cards; constructing a library from the player's pool of mana cards and spell cards; obtaining an opening hand of a predetermined number of trading cards randomly selected from the library of trading cards; executing a turn in sequence with other players to, at the player's option, enter one or more mana cards into play, enter one or more spell cards into play and effectuate the spell associated with the card as the level of energy provided by the mana cards presently in play permits to enable a player to attack other mana cards, spell cards, and any player, to defend against such attack, to modify the effect of any mana card, spell card, and the rules of play, and to alter the state of any card and player.

In accordance with another aspect of the present invention, the step of executing a turn includes the step of tapping a mana card when it is used by turning the mana card approximately 90 degrees from an original position or orientation on a playing surface to thereby flag the card to all other players that the card is in use; and further including a step of untapping mana cards at the end of a turn by turning the mana card back to its original position to thereby unflag the card to all other players that the card is now available for use. Turning the card at other angles such as 30 degrees, 45 degrees, 60 degrees or other angle may also be done to flag a card. Flagging may also be accomplished by marking the card with nondestructive, removable markers or other similar method.

In accordance with another aspect of the beforementioned invention, the steps of executing a turn further include the steps of first untapping all untappable mana cards as permitted by spell cards presently in effect and entering any spell cards into play as permitted during this phase; drawing a card randomly from the library of trading cards, and entering any spell cards into play as permitted during this phase; entering only one mana card into play and one or more spell cards into play as the level of energy permits, and tapping all mana cards used by the spell cards; discarding cards as necessary to reach the level of predetermined number of cards; and announcing to all players the end of the execution of the turn.

As will be appropriated by the foregoing, the present invention provides a game that can be played in many game formats, including hand-holdable cards, electronic games, computer software, interactive networks, board games, and the like. The game is typically fast paced and requires a higher level of strategy, yet being adaptable to permit players of all levels of skill and ability to participate. The game gives a player the unique ability to modify the effect of other cards as well as the fundamental rules of play, and it further gives the player the ability to resist such ability on the part of opposing players, thus pitting players against each other in a battle of strategic skill. The game further includes the unique feature of components that have a tradable and a collectable status. In other words, a certain amount of the game components have a limited availability to the players, thus, increasing the value of the components and encouraging players to trade and collect game components. Furthermore, the game permits players to construct theft own library of components in an effort to obtain competitive advantage as permitted by the provisions and availability of each component, as well as the player's skill in combining the game component prior to play.

BRIEF DESCRIPTION OF THE DRAWINGS

The foregoing and other features and advantages of the present invention will become more readily more appreciated as the same becomes better understood by reference to the following detailed description when taken into conjunction with the accompanying drawings wherein:

FIGS. 1A–1I are plan views of the playing face of collectible trading cards formed in accordance with the present invention with FIG. 1A representing an instant cards, FIG. 1B representing an interrupt card, FIG. 1C representing an enchant enchantment card, FIG. 1D representing an enchant creature card, FIG. 1E representing a sorcery card, FIG. 1F representing a summon card, FIG. 1G representing a land card, FIG. 1H representing an artifact creature card, and FIG. 1I representing an artifact card;

DETAILED DESCRIPTION

Figure 1A:
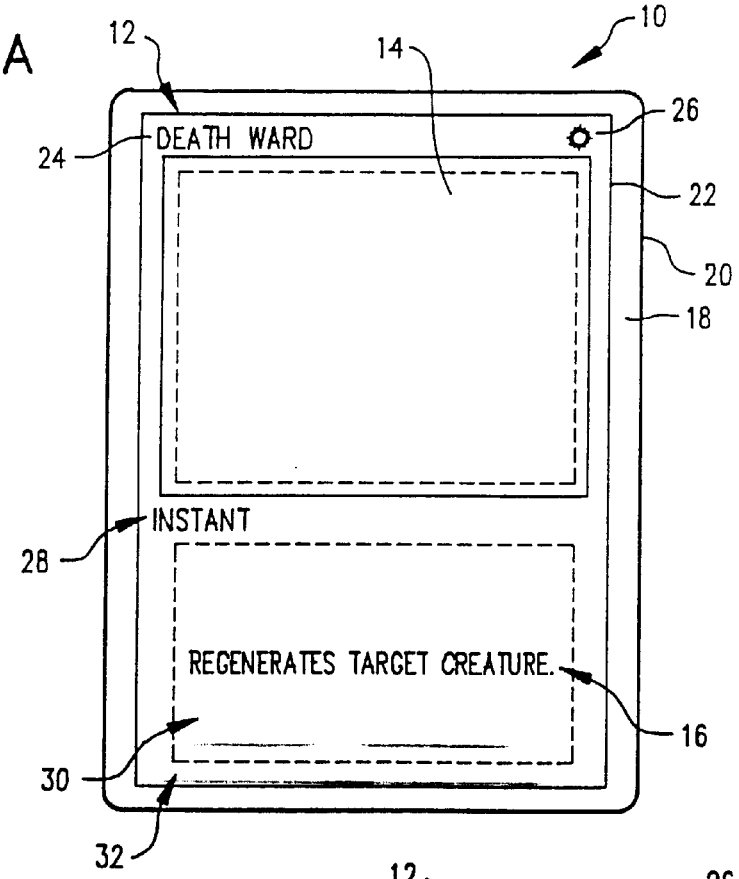

The present invention pertains to a game for two or more players wherein the players, sometimes designated as "wizards," engage in a baffle against each other in an attempt to default or destroy one another. Each player utilites a variety of commands or "spells" that enable a player to alter the state of opposing players and commands, and to modify the rules of play, including the effect of other player's spells, which involves careful strategy and pregame preparation. Thus, the present invention is directed to not only the game components, but also the method of playing the game.

In one embodiment of the invention, each player has access to a reservoir of tradable game components. The reservoir is comprised of multiple copies of unique individual game components. However, some unique game components have fewer copies than other unique game components. Players obtain game components to form a pool of game components. Prior to engaging other players in a duel, each player forms a library of game components by preselecting game components from their individual pool of components. Each player pits his library of game components against the library of game components of every other player. Hence, strategy is required in carefully selecting the library of game components to achieve maximum advantage based on the availability of game components and the skill level of each player in utilizing the game components.

In a typical duel, players take turns casting game components from their opening hand against one or more other players. Ideally, each player has a life value assigned to them that provides an indication of when a player has suffered destruction and is eliminated from the game, which occurs when a player's life value has reached zero. One option is to have players play for an ante, such as a game component drawn from each player's library prior to the execution of turns. At the completion of a duel, the single remaining player collects the ante. Prior to executing turns, players may trade game components as another method of obtaining game components. All of the foregoing is considered part of playing the game.

It is to be understood that the game components can take different forms. For instance, in one version of the game, the components are hand-holdable cards. In another version of the game, the players interact with each other via a computer network, with the game components visually displayed on the monitor. Hence, the foregoing game, including the tradable aspects thereof, are not to be limited to the embodiments described herein.

In another version of the game, each player is provided with energy elements and command elements having commands associated therewith that utilize one or more energy elements to effectuate the commands, thereby enabling players to attack energy elements, command elements, and any player, to defend against such attack, to alter the state of any element and any player, and to modify the effect of energy elements, command elements, and the fundamental rules of play as set forth herein. The energy elements can be represented by physical objects, such as cards, tokens, blocks, or other game pieces known in the gaming industry, or can be visually displayed electronically or represented by symbols or words, such as on an interactive network or in computer software. The same is true with respect to the command elements. As such, the game components are not to be limited by the embodiments described herein.

This also applies to the method of playing the game. In one form, the game involves each player acquiring energy and command elements, utilizing the command elements as the level of energy elements permits to attack, defend, and alter the state of or the effect of the other components, the rules of play, and any player. The method can be expanded to include different types of energy elements that provide varying levels of energy, and different types of command elements that require particular types of energy elements and levels of energy in order to bring the command element into play and to effectuate the command associated with the command element. Furthermore, play can be accomplished between a single player and an artificial intelligence, such as a computer, or expanded up to multiple players battling against one or more opposing players in a single turn. While the fundamentals rules of play apply in multi-player and tournament games, modifications can be made as necessary to accommodate the needs of the game and the desires of the players.

Another feature of the present invention is the limited availability of game components, such as cards, which gives them a collectible nature. This encourages players to trade for more powerful cards and to complete a set of cards for game playing as well as collecting purposes. The method of play can be expanded to include a winner taking one or more of the loser's cards at the end of the game or game set or tournament. For instance, in the trading card version of the invention, the complete collection of cards may number in the hundreds, with perhaps 100 of the cards having limited publication and distribution, thus making them uncommon. Other cards will have even more restricted publication and distribution, making those cards rare. Other cards will have virtually unlimited distribution, rendering them common. Players obtain cards by purchasing them at retail outlets, trading them with other players, or winning them as ante or prizes at games and tournaments.

However, some players are reluctant to play with collectible cards for fear of damage or loss. Hence, an unlimited version of the game can be made available strictly for playing purposes. Thus, it will be readily appreciated that the present invention, while embodying novel and nonobvious game playing concepts and components, can be modified in many ways within the spirit and scope of the invention.

In accordance with one embodiment of the invention, the game is played by two players in which cards in each player's deck represent lands, creatures, spells, and artifacts at a player's disposal. In playing the game, each player pits the player's own deck against an opponent's deck in a duel, with the winner taking one random card to keep from the loser's deck. Over time, each player's deck will grow and shrink. The deck will have weaknesses that a player can attempt to fix by winning cards through games and bartering for cards between games.

When a large number of cards makes up a complete set for the game, it enhances the enjoyment of playing the game, because new opponents may have spell and mana cards that have not been seen before, and the unique deck mixes and styles of play will maintain interest in the game.

The game components consist of cards having a playing face on one side. Ideally, each player will have a deck of at least 40 cards to ensure an appropriate mix of cards for enjoyable play. In addition, each player is assigned a predetermined number of life points that can be represented by counters. The counters can be pennies, poker chips, stones, or whatever is convenient. Life points can even be accounted for on paper, computer or other available accounting means.

Referring initially to FIGS. 1A—1I, depicted therein are nine types of cards available to players. Other types of cards are or may be made available to players to further enhance the game. Each of the cards 10 are preferably constructed of sturdy card stock and having a playing face 12 on which is set forth illustrations 14 and associated indicia about the effect of the card in the game. The opposite side of the card (not shown) contains the name of the game and trade dress design that enables a player to keep the playing face concealed from opposing players until the card is entered into play.

Referring to the card 10 in FIG. 1A, the playing face 12 has an outside border 18 circumscribed by the outside edge 20 of the card 10 and an inside border line 22. The color of the border 18 may be used to indicate if the card is an unlimited card to be used in play or is a limited card that was part of a limited-edition set. In one embodiment of the present invention, a white border 18 indicates an unlimited card that is part of a unlimited-series edition used for regular play. A black border would indicate a card belonging to a limited-series edition that, while it can be used in normal play, once destroyed would be difficult to replace. Collectors' edition sets may be denoted with a gold border on the back side of the card, and they typically have a black border 18 on the playing face. However, collectors' edition sets are not usually used in play.

Inside the border line 22 on the playing face 12, in the upper left-hand corner, there appears the name 24 of the card. In the upper right-hand corner of the card is a mana symbol 26 indicating the type and level of energy or mana required to bring the card 10 into play. This is also known as the "casting cost." The illustration 14 provides a pictorial or graphic representation of the effect of the card. The illustration is not necessary to the playing of the game, and is provided more for the interest and enjoyment of the players. For instance, the illustrations can be used to provide a theme for the game, such as vampires, outer space mystical creatures and settings, etc. They can also be part of a story associated with the theme or around which the theme is built. In the embodiment illustrated herein, a mystical type theme is used.

Figure 1B:
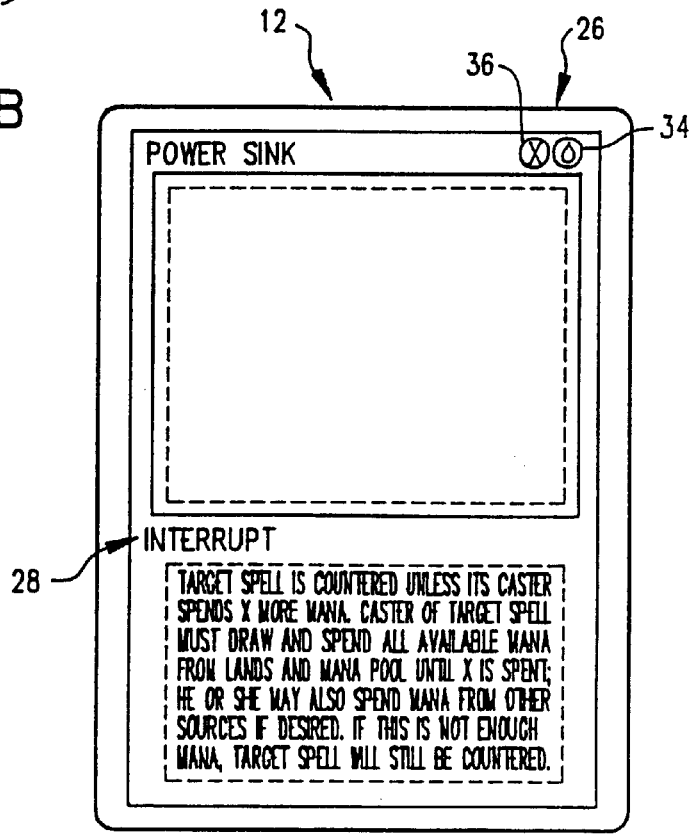
Figure 1C:
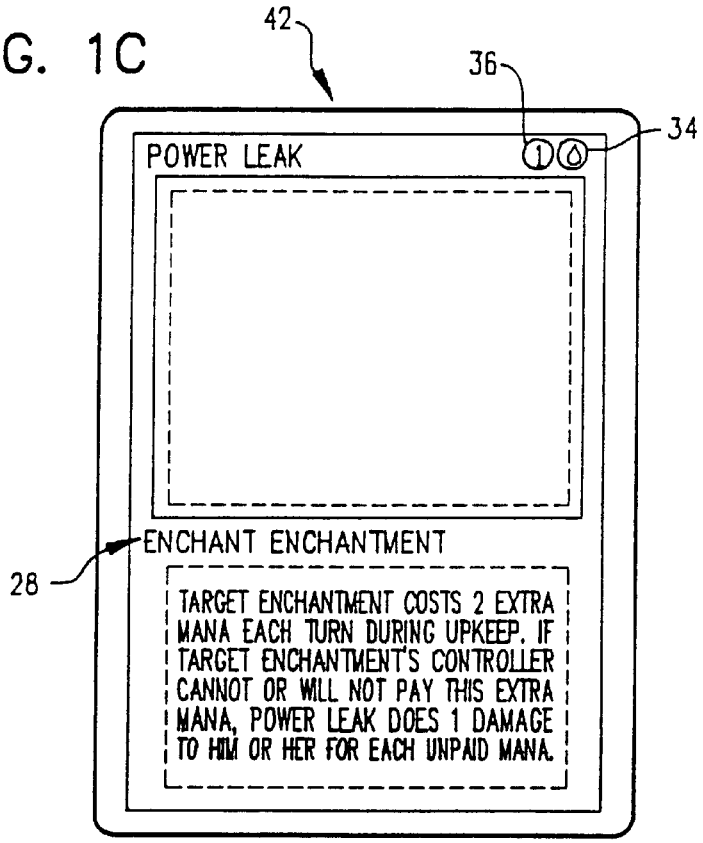
Figure 1D:
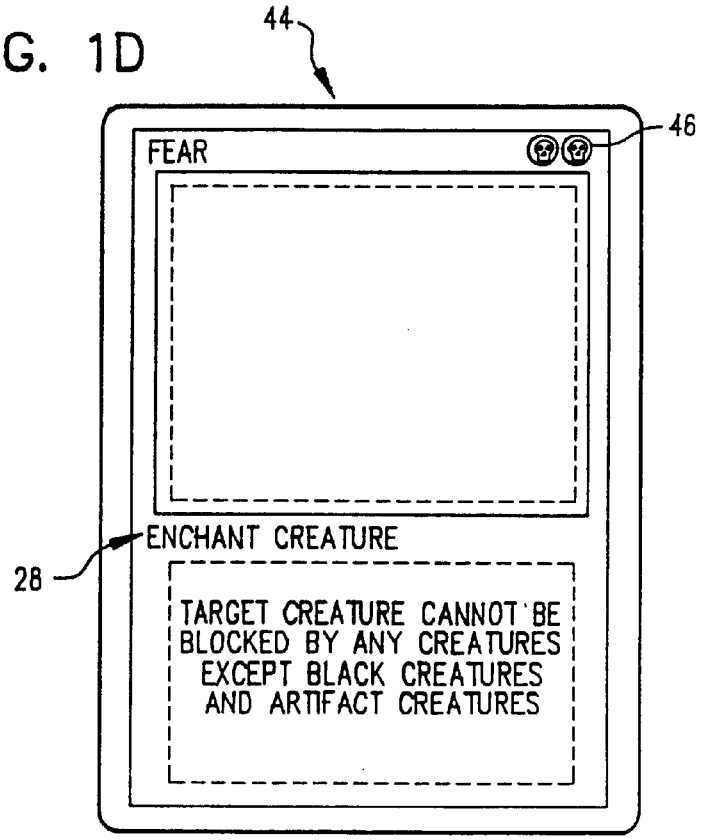
Figure 1E:
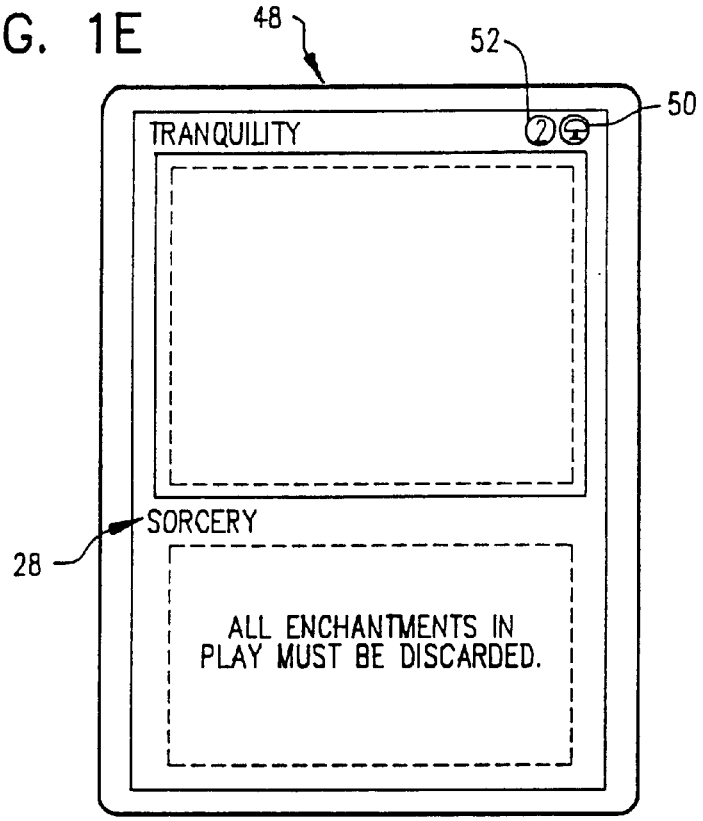
Figure 1F:
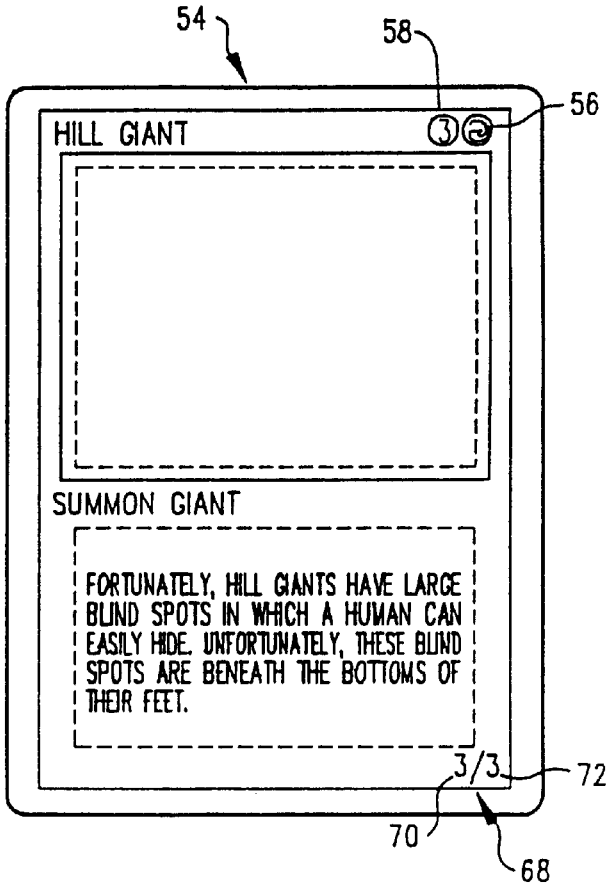
Figure 1G:
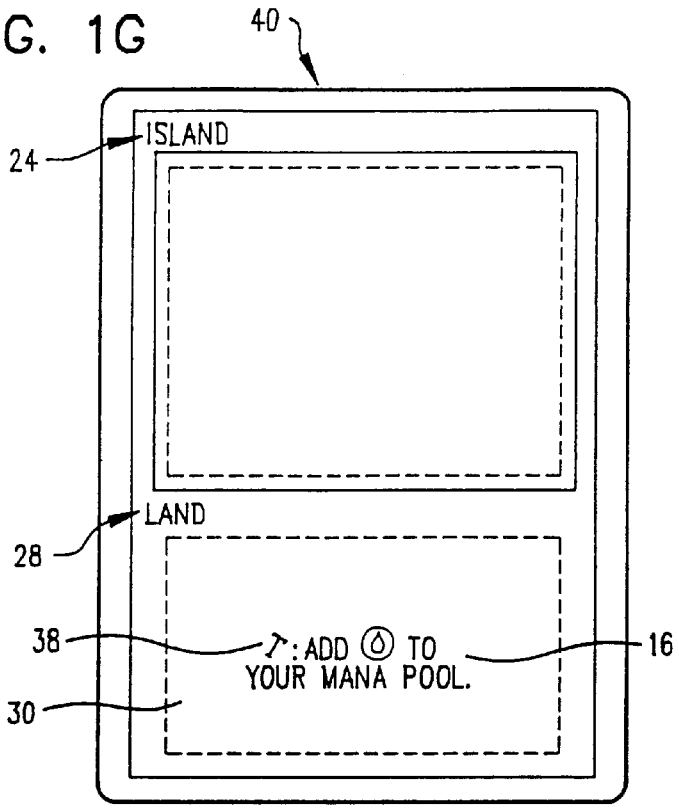

In the middle of the card on the left side is indicia 28 indicating the type of card, such as a land card, which provides mana or energy, (as depicted in FIG. 1G) or a spell card, in this case an "instant." The box below the indicia 28 is the test box 30 containing the indicia 16, which explains the use and effect of the card in play. In the bottom left-hand corner of the card is the identification 32 of the illustrator.

Referring next to FIG. 1B, this card 12 has an "interrupt" indicia 28. The effect of an interrupt will be explained more fully below. The casting cost 26 in the upper right-hand corner consists of a mana symbol 34 that is preceded by an "X" 36. The symbol 34 indicates that an energy card or mana of the type represented by the same symbol (a drop of water) is required to bring the interrupt card 12 into play. The "X" 36 indicates a player may use additional energy or mana of a level and type chosen by the player to increase the effect of the interrupt card 12. The symbol 34 of the drop of water indicates a blue mana, and the card inside the border line 22 may have a blue color to further indicate the type of mana required and the type of magic or spell being used.

Referring back to FIG. 1A, the mana symbol 26 represents white mana, which draws energy from white mana cards, typically identified in the upper left-hand corner with the name 24 of "plains." Similarly, the mana symbol 34 of the drop of water represents blue magic which requires mana or energy from cards denoted in the upper left-hand corner with the name 24 of "island." Such a card 40 is illustrated in FIG. 1G.

As shown in FIG. 1G, the island card 40 has the name 24 "island," and the text 16 in the text box 30 indicates the card provides one blue mana or energy for the player to utilize with spell cards. The symbol of the "T" tipping on its side in the text 16 is the tap symbol 38 indicating the card must be "tapped" when the manna from the card is used in play. "Tapping" is an act of flagging the card to indicate to all players that the energy provided by the card is being used and is no longer available. This can be accomplished in various ways, including placing an object on the card, turning the card over or, more preferably, rotating the card counterclockwise approximately 90 degrees on the playing surface from an original orientation or position. Similarly, "untapping" means rotating the card 90 degrees in a clockwise direction to the original orientation or removing the flag symbol.

Referring next to FIG. 1C, depicted therein is a "enchant enchantment" card 42. As can be seen in the upper right-hand corner, the mana symbol for water 34 is used, and an additional numeral"1" appears before the mana symbol 34 indicating mana one blue and an additional mana of any color are required to bring the enchant enchantment card 42 into play.

In FIG. 1D is depicted an "enchant creature" card 44 having in the upper right-hand corner the skull mana symbol 46. This symbol typically is black and refers to black magic that requires the use of black mana. In the preferred form of this embodiment of this invention, a black mana card has a designation in the upper left-hand corner of "swamp."

Depicted in FIG. 1E is a "sorcery" card 48 having in the upper right-hand corner a mana symbol of a green tree 50 preceded by the additional mana designator 52 consisting of the numeral "2". This indicates one mana of the green color and two additional mana of any color are required. This particular card utilizes green mana drawn from the mana card having in the upper left-hand corner the designation "forest".

FIG. 1F represents a "summon" card 54 having in the upper right-hand corner a red mana symbol 56 and a mana designator 58 having the numeral "3," which indicated a total of four mana are required to bring this card into play, at least one red mana and three other mana of any color. The red mana indicates red magic that receives its energy from mana cards having a name in the upper left-hand corner of "mountain."

Figure 1H:
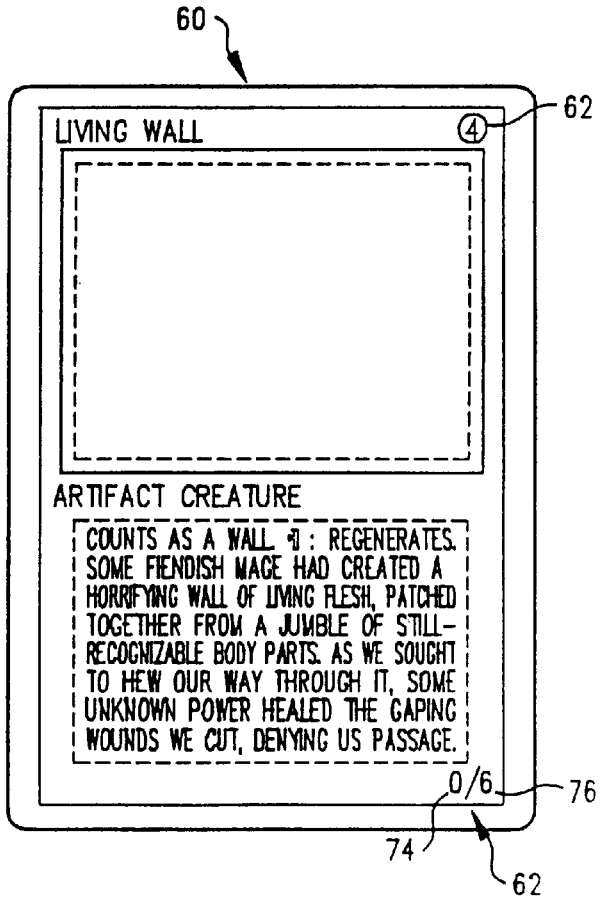
Figure 11:
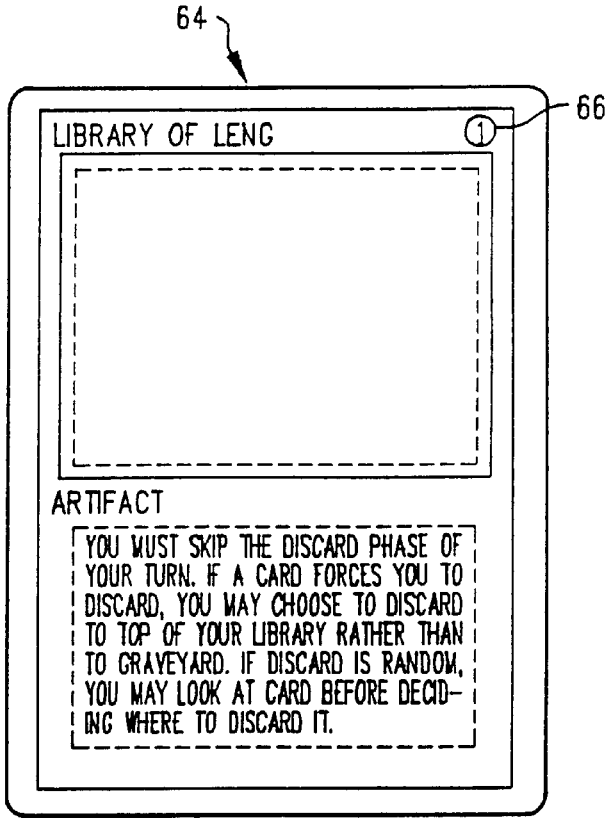

FIG. 1H represents an "artifact creature" card 60 having in the upper right-hand corner a mana designator 62 with a numeral "4." This indicates four mana of any type are required to bring this artifact creature 60 into play. Similarly, FIG. 1I indicates an "artifact" card 64 having a mana designator 66 of one. Again, one mana of any color is required to bring this artifact card into play.

In the lower right-hand corner of the "summon giant" card 54, depicted in FIG. 1F, are two numbers separate by a slash, which are the power/toughness indicator 68. The first number 70, in the case a "3," indicates the Hill Giant will do three points of damage when it attacks. The second number 72, in this case also a "3," indicates that the Hill Giant will provide three points of defense against attack.

This power/toughness indicator 68 also appears on the artifact creature card 60 in FIG. 1H. The first number 74 is a zero, indicating the artifact creature, once brought into play, will inflict no damage and thus is not used to attack. However, the second number 76, in this case the numeral "6," indicates it will provide six points of defense against attack. Some creatures with zero power can attack, however, they do zero damage when blocked or blocking or hitting. This would be desirable where other effects could boost power above the zero level.

The effect of the cards depicted in FIGS. 1A–1I and how they are brought into play will be described more fully below. It is noted, however, there is no indication on the cards of whether the card is a rare card, an uncommon card, or a common card. This enables players to enjoy discovering new cards and determining for themselves which cards are rare or uncommon.

To summarize the embodiment presently being described, the trading card game can be seen to utilize energy cards in the form of the mana card 40. There are five types of mana provided, each with its own particular color. Blue mana, which is utilized by blue magic, is represented by the drop of water symbol 34 shown in FIG. 1B. Cards providing this type of mana have the name 24 "island." A second type of mana is white mana depicted by the symbol 26 in FIG. 1A of a sun or asterisks. White mana cards have the name "plains." Red mana cards utilize the symbol 56 shown in FIG. 1F in association with the color red. The red mana cards have the name "mountains" in the upper left-hand corner. Green mana cards utilize the green tree symbol 50 shown in FIG. 1E in association with the color green, and provide mana for green magic. Mana cards providing green mana have the name "forest" in the upper left-hand corner. Finally, black mana is represented by the mana symbol 46 of a skull shown in FIG. 1D in association with the color black. The name of black mana cards is "swamp".

Thus, there are five types of mana cards that provide five types of energy to a player for bringing spell cards into play.

The spell cards available to players are summon cards 54, socery cards 48, artifact cards 60, 64, enchant cards 42, 44, interrupt cards 12 and instant cards 10. In addition, there are "enchantment" cards that, as previously described, can enchant a card, i.e., enchantments, creatures, artifacts, and lands or the environment, and there are "enchant artifact" cards that cast spells on an artifact. The effect of each of these cards and the manner of playing them is described more fully below.

Turning first to the summon card 54 depicted in FIG. 1F, this particular spell card enables a player to summon a creature into play, in this case the Hill Giant. These creatures further enable a player to attack opposing players and to defend players from such attack. In order to first summon the creature, the card must be placed face up on the table and the appropriate number of the required type of mana cards tapped. These creatures may be summoned into play during the main phase of a player's turn, which is described more fully below. Once a creature card is summoned into play, it remains permanently in play until destroyed, after which it is discarded into a "graveyard" area.

The next type of spell card is the enchant cards 42, 44 depicted in FIGS. 1C and 1D. Enchant cards enable a player to modify the game, including mana cards, spell cards, and the rules of play, and remain permanently in play unless destroyed or removed from play by another spell card. Enchant cards typically require the energy from at least one type of mana to be brought into play. Enchant cards can either enchant a target creature, as the enchant creature card 44 does in FIG. 1D, or it can provide a spell known as an enchantment that has a permanent modifying effect on the environment of the game. Enchantments can enchant a card, i.e., a creature enchantment, artifact, land, or just the game environment. When a enchant create card is used in play, it is typically placed on top of the target creature to indicate the effect of its spell on that creature.

The next type of spell card is the artifact card 60, 64 depicted in FIGS. 1H and 1I. Artifact cards enable a player to modify the game, including mana cards, spell cards, and the rules of play. Their effect is permanent unless destroyed or otherwise removed from the game by other spell cards. No particular color of mana is required to bring an artifact card into play. FIG. 1H illustrates an artifact creature card that is another method of bringing a creature into play. FIG. 1I illustrates an artifact card.

It should be noted that both the enchant cards 42, 44 and the artifact cards 60, 64 can only be played during the main phase of a player's turn. Thus, they have limited availability of use, i.e., limited availability to being brought into play, though once in play they usually remain in effect, typically after a player's turn ceases.

Referring next to FIG. 1A, illustrated therein is an instant card 14 that enables a player at any time to temporarily modify the effect of mana cards, spell cards, and the rules of play. The instant card has a temporary effect, lasting only through the player's turn that brings it into play.

The interrupt card 12 depicted in FIG. 1B is similar to an instant card in that it enables a player to at any time interrupt the game to bring this spell card into play. The interrupt card 12 differs from the instant card 14 in that it has a permanent effect and preempts the instant card's effect. The interrupt card thus enables a player to have a permanent modifying effect on mana cards, spell cards, and rules of play.

Finally, the sorcery card 48 illustrated in FIG. 1E enables a player to temporarily modify the effect of mana cards, spell cards and the rules of play. The sorcery card is limited in that it can only be brought into play during a player's turn and not during the turn of another player.

In one form of the invention, a complete card set consists of 302 cards, comprising a plurality of mana cards and a plurality of spell cards. Each card is unique, but the set can be expanded either by the player or at the time of sale by adding duplicates of either mana cards or spell cards. As will be appreciated from the foregoing, there are six types of spell cards that have varying effects on the game. However, additional spell cards can be added or existing spell cards modified within the spirit and scope of the invention. The spell cards enable a player to modify not only other mana cards and spell cards, but also the fundamental rules of play as described herein and as will be described more fully below.

Figure 2:
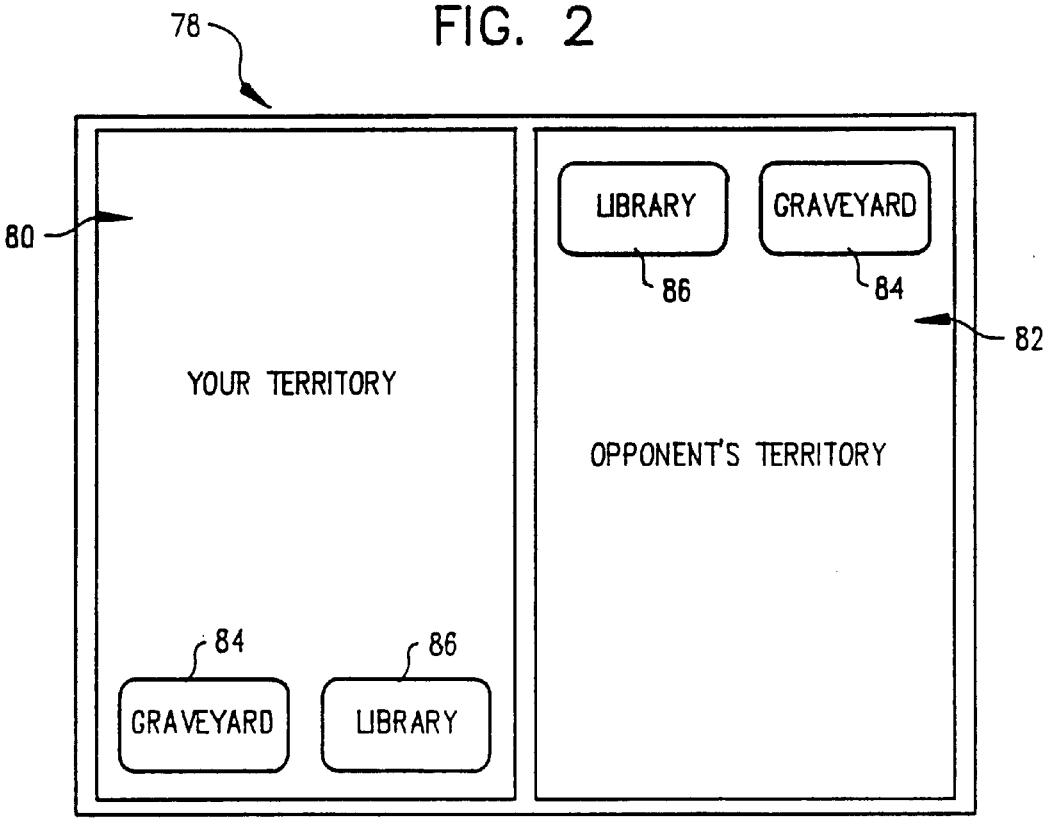
FIG. 2 illustrates the layout of a playing surface for two opponents.

FIG. 2 illustrates a representative playing surface 78 divided into two territories, the player's territory 80 and the opponent's territory 82. Each territory has a graveyard area 84 into which cards removed from play are discarded. Each territory also has a library area 86 from which cards are drawn by players to be initially held in a player's hand.

Figure 3:
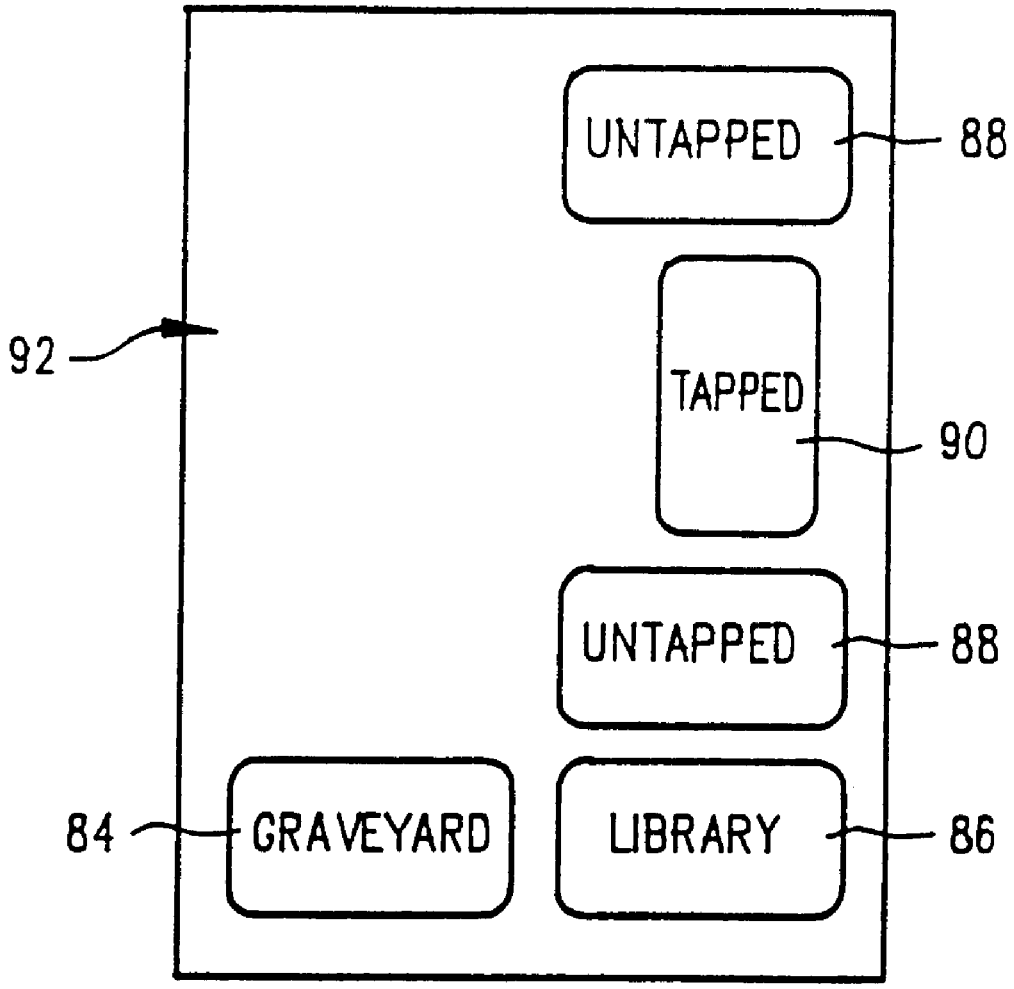
FIG. 3 illustrates placement of cards on the layout of FIG. 2.

FIG. 3 illustrates the playing area of one territory showing the placement of cards as they are brought into play. Untapped mana cards 88 are depicted on either side of a tapped mana card 98. Spell cards are placed in the empty area 92 below the mana cards.

The game is generally played by each player obtaining an opening hand of a predetermined number of randomly selected cards from library 86. The library 86 may be a common library shared by all players or an individual library prepared by each player prior to the game. Each player's library preferably consists of at least 40 cards to ensure an adequate mix of cards is present on which to draw on. The cards are placed face down in the library 86 after first being shuffled. If the game is played for an ante, each player turns over the top of another player's library and sets that card aside as the ante. The winner of the game then takes the loser's card and keeps it as his own.

In constructing libraries 86, players typically obtain a pool of trading cards from a larger reservoir of publicly available trading cards. As previously indicated, some of these trading cards have a limited availability and rare or uncommon, with the remaining cards being common. Players typically obtain these cards by purchase from retailers, trading with other players, or winning them at games and tournaments. From the reservoir, a player then constructs a library of a predetermined number of cards as set by the players prior to the game.

Part of the strategy of the game is constructing a library that combines appropriate mana cards for the type of spell cards the player desires to use for that game. In an alternative embodiment of the method of play, players may randomly select their library without prior reference, thus enhancing the level of chance in the game.

Once the library is selected and placed in the library area 86 of each player, and the ante, if used, is removed, players then draw a predetermined number of cards randomly from the library to form their opening hand. In a preferred embodiment, players draw seven cards. These cards remain in a player's hand and are kept from view of other players until placed in play.

As previously indicated, energy is provided by mana cards. During a player's turn, an untapped mana card is placed as shown in the area 88 on FIG. 3. Typically, only one mana card can be played during a turn. Players may then play spell cards as the level and type of energy provided by the mana card permits in an attempt to attack opposing players, modify the effect of other mana cards, spell cards or the rules of play, or alter the state of any card or any player.

When a player summons a creature into play, the mana card used to enter that creature into play is tapped as shown by the tapped card 90 in FIG. 3. The summon creature 54 card is then placed in the open area 92 on the playing surface, but cannot be used to attack during that turn. On the player's next turn, the creature can then attack, and it inflicts the amount of damage indicated in the power/toughness section 68. If an opposing player cannot defend against the attack, damage is dealt to the opposing player.

In order to enable a player to survive damage, each player is assigned life points of a predetermined number. In one embodiment of the invention, each player is assigned 20 life points. Tokens or counters as previously described may be used to track the points, or paper or other suitable calculation means may also be used. Undefended damage is subtracted from a player's life points. Various spell cards provide additional life points. Thus, a player's life points will fluctuate during a game, and may, at certain phases, go below zero. However, if a player at the end of a turn or phase of a turn has zero life points, the player is removed from the game.

In summary, one method of playing the game for each player comprises the steps of obtaining an opening hand of a predetermined number of cards from the library 86 of cards; executing a turn to enter into play mana cards and spell cards to thereby attack, defend, and modify the effect of other mana cards, spell cards, and the rules of play to thereby deal damage to opposing players to achieve the goal of destroying or defeating opposing players.

The steps of executing a turn by each player will now be described. Each step is known as a phase and consists of the following phases.

1. Untap.
2. Upkeep.
3. Draw a card.
4. Main phase (in any order):
   a. May put a land into play.
   b. May make an attack.
   c. May cast spells (may occur in several phase in main phase).
5. Discard down to predetermine number of cards in hand, if necessary.
6. Inform opponent the player is finished.
7. Heal creatures.

In one embodiment of the invention, a player needs to give an opponent a chance to cast spells or otherwise act after every phase of the turn and even after every action a player takes. Each of these phases will now be described in more detail below.

Tapping and Untapping

Many cards have the symbol of the slanted "T" on them, as noted by reference number 38 in FIG. 1G. If a card has this symbol, the card must be tapped whenever its power or ability is used. Tapping indicates the card cannot be used again until untapped. In one embodiment of the invention, tapping a card means turning it approximately horizontally or 90 degrees from vertical. At the beginning of a player's turn, all cards are untapped, unless prevented from doing so by existing spell cards. Untapping of cards occurs instantaneously, which means that neither the player not the opponents can place spells before or during the untapped phase.

Unkeep

Some cards require a player to take action during unkeep. This requirement will be stated specifically in the text block 30 of the card. If no such cards are in play, the player moves directly to the next phase. Certain spell cards may be played by the player or the opponent during this phase of the turn.

Draw

In this phase, a player draws a card randomly from the top of library and puts it in the player's hand. If there are no cards in the library to draw from, the game ends and the opponent winds. Again, certain spell cards may be used during this phase, which will be described more fully below.

Main Phase

Here, a player may play one land or mana card from their hand at their option, but they may not play more than one. Creature cards may also be summoned into play if there is enough energy or mana available from the untapped land cards presently in play. Creatures summoned in a previous turn by the player may also not attack an opponent. Attacks may occur only during the main phase. This is the only phase during which a player may enter into play (or "cast") summons, enchantments, sorceries, or artifacts.

The other cards, instants and interrupts, are known as fast effects and may be played during the various phases as indicated. Each of the above-referenced spells may be cast at any time during the main phase, except during an attack. During an attack, only fast effects may be played.

Discard

If the player has more than seven cards in their hand, cards must be discarded to bring the hand down to seven. The discarded cards may be those of the player's choice. If the player has seven cards or fewer, the player may not discard. As with the draw phase, only fast effects may be used during this phase. The number of cards permitted in a player's hand may be changed at the beginning of a game.

Inform Opponent

Because a player may not need to discard and because there is no set order to the main phase, an adversary has no way of knowing whether a player has finished his turn unless it is announced. Thus, during this phase, the player announces to opposing players that the player's turn is complete or finished.

Heal Creatures

Once a player announces the turn is complete or finished, an opponent can respond with fast effects, to which the player may then also respond when fast effects. When all of this is completed, any damage to creatures in play is erased. The play then moves to the next player. During the healing phase, spells and special abilities that indicate in the text box 30 that they apply "until end of turn" are now erased or are no longer in effect.

In another embodiment of the invention, if an opponent's life point total drops below one at the end of a phase or at the start or end of an attack, he loses and leaves play. If two players reach or go below zero at one of these times, the game is a draw if it is a two player game.

When a player announces an attack, the player selects the attacking creature and the opponent selects which creatures, if any are available, to defend. Damage is then assessed and destroyed creatures are removed from play. Once the attack is declared, only fast effects may be played. No sorceries may be cast and no new enhancements, creatures, artifacts or land may be put into play.

When a player announces an attack, the opponent may initially respond with fast effects before declaring which creatures will defend. The attacking player may also respond with fast effect. Once the assessment of fast effects has been completed, the opponent then chooses a defending creature or creatures, if any. If an opponent's creatures have been previously tapped, they may not defend. While a player may use as many creatures as available to the player and as the level of mana or energy provided by the mana permits, an opponent may not use one creature to block two or more attacking creatures. However, an opponent may use more than one defending creature to block a single attacking creature. Once defenders are assigned, there is another opportunity for fast effects to be used by both players. Once the assessment of fast defects is completed, damage is then assigned.

An unblocked attacker does an amount of damage equal to its power rating in the power/toughness section 68 of the card. This damage is assessed directly to the player, whose life points are then reduced the indicated amount. However, a blocked attacker does its damage to the card or creature blocking it. A defending creature deals damage to an attacker according to its power rating as it is blocking, unless it becomes tapped during the attack. While most defending creatures will remain untapped, some may become tapped during the fast effects stage. However, all damage takes effect simultaneously. In assessing damage, players compare the amount of damage a creature has taken to its toughness value. If the damage is equal to or greater than its toughness, then the creature has taken a lethal amount of damage. For example, if a creature with a toughness of six took two points of damage from a spell earlier in the turn and then was blocked by a creature with a power of four during the attack, this creature sustained a total of six points of damage, enough to match its toughness and destroy it, thus removing it from play. If a creature takes more damage than its toughness rating, the extra damage does not transfer to the defending player.

If two or more defending creatures block an attacking creature, the attacking player may assign damage from the attacker to the defenders as desired, even if this means one of the creatures takes more than enough damage to kill it. Once damage dealing starts, no other actions may occur until all damage has been assigned.

After damage has been assigned, there is an opportunity to prevent the damage or redirect it. During this period, only damage prevention effects, damage redirection effects, regeneration effects, and interrupts may be used.

While the foregoing provides a description of one embodiment of the game components and methods of play, various changes and enhancements may be made without departing from the spirit and scope of the invention. For instance, various artifacts cards 60, 64 may be added to the game that have additional features. In another embodiment of the invention, artifacts cards never require any particular color of mana to be put into play, and they may be used during the turn in which they are played unless it becomes tapped, which prevents it from being used again that turn. If tapped, the continuous effects of the artifact cease until the artifact is untapped.

Four types of artifacts may be provided. The "mono" artifact typically has one effect during play, and is tapped when used, making it unusable until untapped. "Poly" artifact cards may be used many times each turn and are not tapped after use. "Continuous" artifact cards are artifacts that have a continuous effect on the play environment. They never have a cost to use and the effect cannot be stopped unless the artifact is removed from play or tapped by a spell card. Finally, "creature" artifacts are both artifacts and creatures and, when used as creatures, follow the same rules of play as summon creature cards.

"Enhancements," as previously described, either enchant something or provide a permanent enchantment. The "something" is another card type such as a creature. Enchantments have a lasting effect on the game after they are cast. An enchantment can only be cast during the main phase of a player's turn. Some enchantments have a cost listed before the effect. This is the cost to use the enchantment. An enchantment with a cost may be used and paid for by the player or the one controlling the enchantment (usually the caster). If the enchantment has no cost, it is constantly in effect.

An enchantment may be used more than once each turn, and it is never tapped. For example, if an enchantment costs one red mana to add one to a creature's power, a player can spend three red mana and give an extra three power to the enchanted creature. If an enchant card just says "enchantment," the card face is placed up in front of the player on the playing surface. Such an enchantment will either effect the environment of the game or give a player a special power. All players are subject to the effects of an enchantment unless the card provides otherwise.

For the purpose of certain spells, a card is considered the color of the mana required to cast it. Land has no color, and neither do artifacts. If a card has an effect, that effect is considered to have the same color as the card. If a creature has its toughness or strength changed by a card of a different color than the creature, the color of the creature does not change. However, a card may change color as a result of a spell. It is important to note, though, that a card can only have one color at any one time.

When a card is destroyed or discarded, it is placed into the graveyard 84. If a spell is countered as it is being cast, it also gets into the graveyard 84 without having its effect. Occasionally the card will be removed from the game entirely. In this case, it is set aside until the next game.

Some creatures naturally have specialty abilities and any creature with the appropriate creature enchantments may acquire special abilities. Some special abilities are described below.

Regeneration: Regeneration prevents a creature from going to the graveyard. This ability must be used the moment the creature would normally be removed from play. Creatures that have already been discarded into the graveyard cannot be regenerated. Enchantments of a regenerated creature remain in play. When a creature is regenerated, it is always tapped. A creature that is sacrificed may not be regenerated.

Evasion abilities: Some creatures have the ability flies, which means they can only be blocked by other flying creatures. Other creatures have the ability landwalk such as swampwalk, or forestwalk. If the defender has a land of the relevant type in play, such as swamp or forest, the attacking creatures cannot be blocked, even by creatures having the same landwalk ability.

Bands: A creature with the ability bands has two special powers. A banding creature may join forces with another attacking creature. The resulting band must be blocked or let through as a unit. If any creature in the band is blocked, the entire band is blocked. There can be more than two creatures in an attacking band, although all but one must have the banding ability.

Any time a group of creature blocks or is blocked and one or more have the ability, than the damage they receive from rival creatures is not distributed among them as usual, but are distributed by the player who has the blocking creature. That player may choose to assign more damage to a creature than it can survive.

Trample: A creature with trample can do damage to the defender when attacking, even if blocked. Such creature does a special kind of damage called trample damage. If a blocking creature is destroyed by the trampler, then any trample damage done in excess of that amount is applied to the defender instead.

Protection: A creature with protection from one or more colors of magic cannot be affected by any magic of those colors. For example, a creature with protection from blue cannot be blocked by blue creatures, dealt damage by blue creatures or enchanted, damaged or otherwise effected by blue cards. Damage done by such a creature cannot be prevented using blue cards. Note that creature does not have this ability until it is successfully summoned. If, for example, a player is summoning a creature with protection from blue magic, the rival can still cast a blue interrupt that affects the summoning spell.

First strike: Creatures with first strike have the ability to hit their blockers or the creatures they are attacking before being damaged themselves. During the dealing damage phase in an attack, first strikers deal their damage first, simultaneously. Afterwards, surviving creatures without first strike deal their damage.

Mana enhanced power/toughness: A player may be able to increase power or toughness of some creatures by spending means. This enhancement lasts until the end of the turn. A player may spend as much mana of the appropriate type as they like to increase a creature's characteristic. If a creature's characteristic is listed as +1/+0 and is preceded by a black mana symbol of a skull 46, the player can increase the creature's power by 1 for each added black mana, but the player could not increase its toughness.

Timing: Players whose turn it is announce their spell and effect first. The other player can respond to each one with one or more fast effects (instants, artifacts in play, enchantments in play, or creature special abilities). These reactions can be reached to, and so forth, and nothing happens until both players have finished taking actions. At this point, all spells take effect simultaneously. Usually, the outcome will be clear, but if the timing of any two effects makes any difference, the player casting the later spell gets to choose whether it occurs before or after the conflicting spell. Once it is announced, nothing can stop a fast effect unless it is countered immediately by an interrupt. Once a spell is announced, the mana has been spent whether or not the spell has taken effect as planned.

An exception to this are interrupts, which are resolved as soon as they are announced, unless the interrupt itself is interrupted. A player should not literally interrupt a rival with interrupts. A player should first let the rival finish saying how their spell will be used and how much mana is being spent on it. The player then announces their interrupt before their spell is cast. The rival must give the player the opportunity to do this. The rival may also interrupt the spell or the player's interrupt with another interrupt and so forth. If the same spell has one or more interrupts done during its casting, the caster of that spell does his or her interrupts first, regardless of whether it was announced first. Interrupts take effect immediately, unless they themselves are interrupted, in which case the player resolves his intentions first. Interrupts commonly counter the spell being cast, but they sometimes change it in some way or have some peculiar side effect. Effects which take mana into a player's mana pool are usually interrupts, so a player can get mana for spells quickly enough to respond to a rival's actions.

Though a spell or effect that needs a target cannot be used unless a target exists, it is possible for a target to disappear before the spell effects it. In this case, the effect is ignored, though mana is used and the spell is still considered cast.

Other changes and modifications may be made that still fall within the scope and spirit of the present invention. A number of these are described in the publication entitled *Pocket Player's Guide,* published by the assignee herein, Wizards of the Coast, Inc. of Redmond, Wash., copyright 1994. This publication is specifically incorporated herein by reference. Also specifically incorporated herein by reference are all 302 original cards associated with the game marketed under the trademark MAGIC: THE GATHERING and registered in the U.S. Library of Congress, Copyright Office, under Certificate of Registration VA 596-507; as well as enhancements to the game MAGIC: THE GATHERING—ANTIQUITIES registered in the U.S. Library of Congress, Copyright Office, under Copyright Registration VA 596-263, and MAGIC: THE GATHERING—ARABIAN KNIGHTS, registration pending in the U.S. Library of Congress, Copyright Office. The ANTIQUITIES and ARABIAN KNIGHTS enhancements to the original MAGIC: THE GATHERING game contain additional cards with new effects although utilizing the same types of spells described herein. It is contemplated that other enhancements can be provided within the spirit and scope of the present invention.

It is also contemplated that the present invention can be used on existing and readily available electronic devices, such as computers, video games, electronic games, and on interactive networks utilizing computer software and text. Such electronic devices can visually display the cards and enable the players to manipulate the cards and execute turns as described hereinabove. Commercially available electronic communication devices can also be provided to enable players to communicate with each other over long distances.

Another version of the game can be played using a playing board. This board has pathways on it divided into squares on which the players move. The pathways are surrounded colored areas called lands. When two players meet on the same square in a land area, they duel by playing their own deck of cards against each other, as set forth above. The rules may require the players to use the color of magic or color of cards corresponding to the color of land surrounding the pathway square on which their pieces are resting.

Hence, the spirit and scope of the invention is to be limited only by the scope of the claims that follow.

The embodiments of the invention in which an exclusive property or privilege is claimed are defined as follows:

[1. A method of playing games involving two or more players, the method being suitable for games having rules for game play that includes instructions on drawing, playing, and discarding game components, and a reservoir of multiple copies of a plurality of game components, the method comprising the steps of:

each player constructing their own library of a predetermined number of game components by examining and selecting game components from the reservoir of game components;

each player obtaining an initial hand of a predetermined number of game components by shuffling the library of game components and drawing at random game components from the player's library of game components; and each player executing turns in sequence with other players by drawing, playing, and discarding game components in accordance with the rules until the game ends, said step of executing a turn comprises:

(a) making one or more game components from the player's hand of game components available for play by taking the one or more game components from the player's hand and placing the one or more game components on a playing surface; and (b) bringing into play one or more of the available game components by:

(i) selecting one or more game components; and (ii) designating the one or more game components being brought into play by rotating the one or more game components from an original orientation to a second orientation.]

[2. A method of playing a trading card game, the game components including rules of play, which include instructions on execution of a turn, and the predetermined number of cards in a library of trading cards and the hand of trading cards, and a reservoir of trading cards, the method of playing the card game for each player comprising the steps of:

collecting an individual pool of trading cards from the reservoir of trading cards by purchasing and trading with others;

constructing a library of a predetermined number of trading cards from the player's pool of trading cards by selecting individual cards the player elects to play with;

obtaining a hand of a predetermined number of trading cards from the player's library of trading cards; and executing a turn at the player's option, in accordance with other players to, at the player's option, enter and remove one or more cards into and out of play in accordance with the rules, said step of executing a turn for each player comprises:

(a) drawing one or more trading cards from the library of trading card;

(b) entering one or more trading cards into play by placing the one or more trading cards face up in a first orientation on a playing surface, and at the player's option, using one or more trading cards that have been entered into play in accordance with the rules and tapping each trading card used in play so all players are aware the trading card is in use by turning the trading cards from the first orientation to a second orientation on the playing surface; and (c) discarding one or more trading cards into a discard area on the playing surface as necessary to maintain the predetermined number of cards in the player's hand of trading cards.]

[3. A method of playing card games, the method being suitable for card games having rules of play and multiple copies of a plurality of cards, the rules of play including instructions on executing turns, the predetermined number of cards in the players library and hand of cards, and the objective of the game, the method comprising the steps of:

each player obtaining a pool of cards from the multiple copies of the plurality of cards by purchasing or trading with others or playing a card game with others for ante;

each player constructing a library of a predetermined number of cards by examining and selecting cards from the player's pool of cards;

each player obtaining a hand of a predetermined number of cards from the player's library of cards by first shuffling the player's library of cards and randomly drawing the hand of cards therefrom; and each player executing a turn until the game concludes in accordance with the rules of play, said step of executing a turn includes placing one or more cards on a playing surface for other players to see the playing face on the one or more cards and designating one or more of the cards on the playing surface for entry into play.]

[4. The method of claim 3, wherein said step of designating one or more of the cards comprises rotating the one or more cards on the playing surface from an original orientation to a second orientation.]

[5. The method of claim 3, wherein said second orientation is 90 degrees from the first orientation.]

[6. The method of claim 3, wherein said step of executing a turn comprises the initial step of rotating the player's cards previously designated in a prior turn from the second orientation to the original orientation.]

*7. A method of playing games involving two or more players, the method being suitable for games having rules for game play that include instructions on drawing, playing, and discarding game components, and a reservoir of multiple copies of a plurality of game components, the method comprising the steps of:*

*each player constructing their own library of a predetermined number of game components by examining and selecting game components from the reservoir of game components;*

*each player obtaining an initial hand of a predetermined number of game components by shuffling the library of game components and drawing at random game components from the player's library of game components; and*

*each player executing turns in sequence with other players by drawing, playing, and discarding game components in accordance with the rules until the game ends, said step of executing a turn comprises:*

*(a) making one or more game components from the player's hand of game components available for play by taking the one or more game components from the player's hand and placing the one or more game components on a playing surface; and*

*(b) bringing into play one or more of the available game components by:*

*(i) selecting one or more game components; and*

*(ii) designating the one or more game components being brought into play by rotating the one or more game components from an original orientation to a second orientation.*

*8. A method of playing a trading card game, the game components including rules of play, which include instructions on execution of a turn, and a predetermined number of cards in a library of trading cards and a hand of trading cards, and a reservoir of trading cards, the method of playing the card game for each player comprising the steps of:*

*collecting an individual pool of trading cards from the reservoir of trading cards by purchasing and trading with others;*

*constructing a library of a predetermined number of trading cards from the player's pool of trading cards by selecting individual cards the player elects to play with;*

*obtaining a hand of a predetermined number of trading cards from the player's library of trading cards; and*

*executing a turn at the player's option, in sequence with other players to, at the player's option, enter and remove one or more cards into and out of play in accordance with the rules, said step of executing a turn for each player comprises:*

*(a) drawing one or more trading cards from the library of trading card;*

*(b) entering one or more trading cards into play by placing the one or more trading cards face up in a first orientation on a playing surface, and at the player's option, using one or more trading cards that have been entered into play in accordance with the rules and tapping each trading card used in play so all players are aware the trading card is in use by turning the trading cards from the first orientation to a second orientation on the playing surface; and*

*(c) discarding one or more trading cards into a discard area on the playing surface as necessary to maintain the predetermined number of cards in the player's hand of trading cards.*

*9. A method of playing card games, the method being suitable for card games having rules of play and multiple copies of a plurality of cards, the rules of play including instructions on execution turns, a predetermined number of cards in the players library and hand of cards, and an objective of the game, the method comprising the steps of:*

*each player obtaining a pool of cards from the multiple copies of the plurality of cards by purchasing or trading with others or playing a card game with others for ante;*

*each player constructing a library of a predetermined number of cards by examining and selecting cards from the player's pool of cards;*

*each player obtaining a hand of a predetermined number of cards from the player's library of cards by first shuffling the player's library of cards and randomly drawing the hand of cards therefrom; and*

*each player executing a turn until the game concludes in accordance with the rules of play, said step of executing a turn includes placing one or more cards on a playing surface for other players to see a playing face on the one or more cards and designating one or more of the cards on the playing surface for entry into play.*

*10. The method of claim 9, wherein said step of designating one or more of the cards comprises rotating the one or more cards on the playing surface from an original orientation to a second orientation.*

*11. The method of claim 10, wherein said second orientation is 90 degrees from the original orientation.*

*12. The method of claim 10, wherein said step of executing a turn comprises the initial step of rotating the player's cards previously designated in a prior turn from the second orientation to the original orientation.*

*13. A method of playing a card game, comprising:*

*obtaining a hand of cards from a supply of cards; and*

*executing a turn by placing one or more cards from the hand of cards on a playing surface and designating one or more of the cards on the playing surface by rotating the one or more cards from an original orientation to a second orientation.*

*14. The method of claim 13 wherein the one or more cards from the hand of cards are placed on the playing surface with a playing face exposed to view.*

*15. The method of claim 13 wherein the second orientation is 90 degrees from the first orientation.*

*16. The method of claim 13, further comprising undesignating one or more previously designated cards by rotating the one or more previously designated cards from the second orientation to the original orientation.*

*17. A method of playing an electronic card game, comprising:*

*designating a hand of cards from available cards on an electronic display device;*

*executing a turn by causing one or more cards from the hand of cards to be displayed in a playing area displayed on the display device and designating the one or more cards in the playing area by positioning the one or more cards in a predetermined orientation.*

*18. The method of claim 17 wherein the predetermined orientation is a 90° rotation from an initial orientation.*

*19. A method of playing a game for two or more players, the game including rules of play and game components, the method comprising:*

*constructing a library of game components from a plurality of game components that comprise a first set of game components and a second set of game components, a portion of the plurality of game components having limited availability with respect to a remainder of the plurality of game components, each game component in the first set of game components having a point value associated therewith, and each game component in the second set of game components having a point value cost associated with using the game component;*

*obtaining a hand of game components from the library of game components; and*

*executing a turn at the player's option that comprises using one or more of the first set of game components in conjunction with one or more of the second set of game components in accordance with the rules of play.*

*20. The method of claim 19 wherein constructing a library comprises examining and selecting game components.*

*21. The method of claim 19, further comprising designating a status of one or more game components used in the game.*

*22. The method of claim 21 wherein designating comprises rotating the game component from one orientation to another orientation.*

*23. A method of playing a card game for two or more players, the game including rules of play and a plurality of cards, the method comprising:*

*obtaining a hand of cards, the cards comprising energy cards and effect cards, a portion of the cards having limited availability, at least one effect card having indicia corresponding to an energy value cost of using the at least one effect card, and each energy card having indicia corresponding to an energy value for use in conjunction with the at least one effect card; and*

*executing a turn that comprises using one or more energy cards in conjunction with the at least one effect card from the player's hand of cards in accordance with the indicia on the cards and the rules of play.*

*24. The method of claim 23 wherein the method further comprises before obtaining a hand of cards, each player constructing a personal library of cards by examining and selecting cards from a plurality of cards, and wherein obtaining a hand of cards comprises each player obtaining a hand of cards from the player's library of cards.*

*25. The method of claim 23 wherein executing a turn comprises designating one or more cards used in the turn.*

*26. The method of claim 25 wherein the designating comprises rotating one or more cards from a first orientation to a second orientation.*

*27. A method of playing a game for two or more players, comprising:*

*each player constructing a library game components by examining and selecting from a plurality of energy components and effect components, at least one of the energy components having associated therewith an energy value, and at least one of the effect components having associated therewith an energy value cost of playing the effect component;*

*each player obtaining an opening hand of energy and effect components from the player's library of components; and*

*each player executing a turn, at the player's option, by playing one or more energy components and playing one or more effect components in accordance with the associated energy and with the rules of play.*

*28. A method of playing a card game, the game including rules of play and game cards, the method of playing the card game for each player comprising:*

*obtaining an individual pool of cards from a reservoir of mana cards and spell cards, the mana cards having indicia of the number of mana each mana card is worth, the spell cards having indicia thereon that indicates the effect of the spell card on one or more of the mana cards, spell cards, and the rules of play and that indicates the number of mana from mana cards to be played in conjunction with each spell card;*

*constructing a library of cards from the individual pool of cards;*

*obtaining a hand of cards from the library of cards; and*

*executing a turn in sequence with other players to, at the player's option, play one or more cards in accordance with the indicia on the cards and with the rules of play.*

*29. A method of playing a card game, the game including rules of play and a plurality of cards, the method of playing the card game for each player comprising:*

*collecting an individual pool of cards by one or more of trading, purchasing, bartering, and winning cards, the cards including mana cards and spell cards, each mana card having indicia of an amount of mana the mana card is worth, each spell card having indicia of the amount of mana from mana cards that must be played in conjunction with playing the spell card and of an effect that playing the spell card has on mana cards, spell cards, and the rules of play, a portion of the plurality of cards having limited availability;*

*constructing a library of cards by examining and selecting cards from the player's pool of cards;*

*obtaining a hand of cards from the player's library of cards; and*

*executing a turn in sequence with other players to, at the player's option, play one or more mana cards and spell*

*cards in accordance with the indicia on the cards and the rules of play.*

*30. A method of playing a game for two or more players comprising:*

*each player constructing a library game components comprising energy components and command components from a plurality of energy components and command components, each energy component having an energy value associated therewith and each command component having an energy value cost associated with playing the command component, wherein one or more energy components having a total energy value equal to or greater than the energy value cost must be played in order to play a command component having the associated energy value cost;*

*each player selecting an initial number of game components from the player's library of game components; and*

*each player executing a turn by, at the player's option, playing one or more energy components and playing one or more command components as permitted by the available energy value from the energy components in play.*

*31. The method of claim 30 wherein players communicate with other players via a network of computers, each player having a monitor on which to display the game components.*

*32. A method of playing a card game on one or more computers, the card game having rules of play, the method comprising:*

*designating an individual pool of cards from a reservoir of cards, and privately displaying one or more of the individual pool of cards on a monitor;*

*selecting an individual library of cards from the individual pool of cards and privately displaying the library of cards on the monitor;*

*obtaining a hand of cards from the individual library of cards and privately displaying the hand of cards on the monitor; and*

*executing a turn in accordance with the rules of play and displaying on all player's monitors the cards played on each player.*

*33. A method of playing a card game having a plurality of cards, the method comprising:*

*obtaining a hand of cards from a plurality of cards that includes one or more cards from a first set of cards and one or more cards from a second set of cards, the first set of cards having indicia corresponding to a condition of using the first set of cards in play, and a second set of cards having indicia corresponding to meeting the condition of using the first set of cards in play;*

*identifying a condition of using a selected card from the first set of cards; and*

*using one or more cards from the second set of cards that meet the identified condition for using the selected card from the first set of cards.*

*34. The method of claim 33 wherein using one or more cards from the second set of cards further comprises using the selected card in conjunction with using the one or more cards from the second set of cards.*

*35. The method of claim 33 wherein the indicia of condition comprises indicia of a point value cost, and the indicia of meeting the condition comprises indicia of a point value.*

*36. A method of playing a card game by at least first and second players, the method comprising:*

*the first player acquiring at separate times a first personal subset of cards from a set of available cards, wherein each card of a certain type has effects that differ from other cards of a different type in the set of cards, wherein the set of available cards includes point cards and effect cards, and wherein one or more cards from the set of available cards have more limited availability than the other cards, and wherein the first player, from the first personal subset of cards, forms a first playable subset of cards;*

*the second player acquiring a second personal subset of cards from the set of available cards and forming a second playable subset of cards; and*

*the first and second players exchanging turns playing a game with their respective first and second subsets of playable cards, wherein exchanging turns comprises each player taking an individual turn wherein one or more point cards must be used by the player in conjunction with the player using one of the effect cards.*

*37. A card game article of manufacture, comprising:*

*a set of cards comprising point cards and effect cards, each point card and each effect card having a point value associated therewith wherein before playing an effect card of an indicated point value, one or more point cards totaling the indicated point value must be played by the player, and wherein at least some of the effect cards in the set of cards are more powerful and have a greater effect on game play than effect cards having lesser effect on game play.*

*38. The article of manufacture of claim 37 wherein a plurality of the effect cards further comprise indicia of the effect of the plurality of cards on game play, and further wherein cards having a greater effect on game play have limited availability in the set of cards and have a higher point value than cards having a lesser effect on game play.*

*39. A method of playing a game for two or more players, the game including rules of play and game elements, the method of play and for each player comprising:*

*(a) obtaining a hand of game elements that comprise energy and effect elements from a plurality of game elements, each energy element having indicia thereon indicating an energy value of the energy element, and each effect element having indicia of an energy value from the energy elements that must be played by the player in conjunction with playing the effect element;*

*(b) executing a turn in sequence with other players in accordance with the rules of play, each play leaving the game when a life level of the player reaches a final value from an initial value, each turn comprising one or more of:*

*playing one or more energy elements;*

*playing one or more effect elements as permitted by an energy value available from the energy elements in play; and*

*discarding one or more of the game elements as necessary to maintain a predetermined number of game elements in the hand.*

*40. The method of claim 39 wherein each turn further comprises obtaining one or more game elements from the plurality of game elements.*

*41. The method of claim 39 wherein executing a turn further comprises flagging each energy element used to contribute to the energy value that must be played by each effect element so that all players are aware that each flagged energy element is in use.*

*42. The method of claim 41 wherein executing a turn initially includes unflagging one or more of the player's energy elements that were flagged in a previous turn.*

*43. A method of playing a card game on one or more computers, comprising:*

*selecting a hand of cards, and displaying the hand of cards on the player's monitor, wherein a first subset of the cards have indicia indicating a point value cost for using in play the one or more cards from the first subset of cards, and a second subset of the cards have indicia thereon of a point value associated with paying the point value cost;*

*identifying from the hand of cards displayed on the player's monitor a point value cost for playing a selected card from the hand of cards; and*

*obtaining cards with a sufficient point value to pay the point value cost for playing the selected card.*

*44. The method of claim 43, further comprising playing the obtained cards and displaying on each player's monitor each card played by other players.*

*45. The method of claim 44, further comprising flagging each card that is used to pay the point value cost associated with the selected card.*

*46. The method of claim 45 wherein flagging comprises rotating the card from a first orientation to a second orientation on the monitor.*

*47. An article of manufacture for use by a player in a game, comprising:*

*rules of game play;*

*a set of cards comprising a plurality of casting cards, wherein the casting cards are a subset of the set of cards, wherein at least some of the casting cards in the subset have a total point value indicia representing a total number of points a player must expend under the rules of game play in order to play the casting card, each casting card further including indicia indicating the effect that playing the casting card will have on game play.*

*48. The article of claim 47 wherein the rules of game play comprise at least one rule requiring the playing of point cards having a cumulative point value at least equal to the point value of each casting card to be played.*

*49. The article of claim 47 wherein the set of cards comprises at least common and rare cards, and wherein the common cards are more numerous in the set of card than the rare cards.*

*50. A card game, comprising:*

*rules of play defining the game and game play;*

*a reservoir of multiple copies of game cards for use by a player to construct a personal deck of cards for game play, a portion of the game cards having fewer available copies than the other game cards, the game cards comprising:*

*a first subset of game cards, each card having indicia corresponding to one or more conditions for a player to use the card in game play and of the effect on game play of a player using the card; and*

*a second subset of game cards, each card having corresponding indicia corresponding to meeting the one or more conditions.*

*51. The game of claim 50, further comprising a third subset of game cards for use by a player without meeting the conditions and having indicia of the effect on game play of a player using the card, and wherein the rules of play comprise at least one rule permitting any player to use a card from the third subset of game cards during any player's turn and at least one rule requiring the flagging of each card from the second subset of cards that is used in game play to meet the one or more conditions of the first subset of cards, and wherein the second subset of cards represents a form of energy and the one or more conditions associated with using the first subset of cards comprises an energy cost to be met by the second subset of cards.*

*52. The game of claim 50, wherein the rules of play further comprise at least one rule requiring the unflagging of each flagged card that is no longer used to meet the one or more conditions of the first subset of cards.*

*53. A method of card game play, the card game having rules of play and a plurality of game cards, the method comprising:*

*each player constructing a deck of game cards from a reservoir of multiple copies of game cards, a portion of the game cards having fewer available copies in the reservoir of game cards than the other game cards, the game cards comprising a first subset of game cards having indicia of one or more conditions for a player to use the card in game play and of the effect on game play of a player using the card; a second subset of game cards having corresponding indicia of meeting the one or more conditions;*

*each player drawing a hand of cards from the player's deck of cards;*

*each player executing a turn, comprising using one or more of the second subset of cards, using one or more of the first subset of cards as permitted by the second subset of cards, and drawing one or more cards from the deck of cards.*

*54. The method of claim 53, further comprising a third subset of games cards for use by a player without meeting the one or more conditions, the cards in the third subset of game cards having indicia of the effect on game play of a player using the card, and wherein executing a turn further comprises any player playing a card from the third subset of cards during the player's turn or during any other player's turn.*

*55. A method of playing games involving two or more players, the method being suitable for games having rules for game play that include instructions on drawing, playing, and discarding game components, and a reservoir of multiple copies of a plurality of game components, the method comprising:*

*each player constructing their own library of game components by examining and selecting game components from the reservoir of game components;*

*each player obtaining a hand of game components by shuffling the library of game components and drawing at random game components from the player's library of game components; and*

*each player executing turns in sequence with other players in accordance with the rules until the game ends, wherein at least one turn comprises:*

*(a) making one or more game components from the player's hand of game components available for use by selecting the one or more game components from the player's hand and moving the one or more game components to a playing area; or*

*(b) using one or more of the available game components by:*

*(i) selecting one or more game components; and*

*(ii) designating the one or more selected game components by rotating the one or more game components from an original orientation to a second orientation.*

*56. A method of playing a card game, the game components including rules of play, the method of playing the card game for each player comprising:*

*collecting an individual pool of cards from a reservoir of trading cards by purchasing and trading with others;*

*constructing a library of cards from the player's pool of cards by selecting individual cards the player elects to play with;*

*obtaining a hand of cards from the player's library of cards; and*

*executing a turn at the player's option, in sequence with other players, wherein executing a turn for each player comprises the following in any order:*

(*a*) *drawing one or more cards from the library of cards;*

(*b*) *placing one or more cards from the player's hand of cards face up in a first orientation on a playing surface, and at the player's option, using one or more cards that have been placed on the playing surface, comprising tapping at least one card on the playing surface so all players are aware the card is in use by turning the card from the first orientation to a second orientation on the playing surface.*

*57. A method of playing card games, the method being suitable for card games having rules of play and multiple copies of a plurality of cards, the rules of play including instructions on executing turns, and an objective of the game, the method comprising:*

*each player obtaining a pool of cards from the multiple copies of the plurality of cards by purchasing or trading with others or playing a card game with others for ante;*

*each player constructing a library of cards by examining and selecting cards from the player's pool of cards;*

*each player obtaining a hand of cards from the player's library of cards by first shuffling the player's library of cards and randomly drawing the hand of cards therefrom; and*

*each player executing a turn until the game concludes in accordance with the rules of play, wherein executing a turn comprises one or more of placing one or more cards on a playing surface for other players to see a playing face on the one or more cards and designating one or more of the cards on the playing surface.*

*58. The method of claim 57, wherein designating one or more of the cards comprises rotating the one or more cards on the playing surface from an original orientation to a second orientation.*

*59. The method of claim 58, wherein the second orientation is 90 degrees from the original orientation.*

*60. The method of claim 58, wherein executing a turn comprises initially rotating one or more of the player's cards previously designated in a prior turn from the second orientation to the original orientation.*

* * * * *

UNITED STATES PATENT AND TRADEMARK OFFICE

CERTIFICATE OF CORRECTION

PATENT NO. : RE 37,957 E
DATED : January 7, 2003
INVENTOR(S) : Garfield

It is certified that error appears in the above-identified patent and that said Letters Patent is hereby corrected as shown below:

Title page,
Item [75], Inventor, should read -- Richard Channing Garfield, Seattle, WA (US) --;

Column 1,
Line 13, “utilize” should be -- utilizes --;
Line 24, “biological” should be -- biographical --;

Column 2,
Line 15, “complete” should be -- compete --;
Line 40, “elements;” should be -- elements, --;
Line 57, “potion” should be -- portion --;

Column 3,
Line 32, “defined” should be -- defend --;

Column 4,
Line 53, “to” should be -- of --;

Column 5,
Line 43, “or” should be -- of --;

Column 6,
Line 22, “card” should be -- cards --;

Column 7,
Line 1, “appropriated” should be -- appreciated --;
Line 19, “theft” should be -- their --;
Line 22, “component” should be -- components --;
Line 48, “baffle” should be -- battle --;
Line 49, “default” should be -- defeat --;
Line 49, “utilites” should be -- utilizes --;

Column 8,
Line 57, “fundamentals” should be -- fundamental --;

Column 10,
Line 20, “test” should be -- text --;

Column 11,
Line 34, “the” should be -- this --;

UNITED STATES PATENT AND TRADEMARK OFFICE

CERTIFICATE OF CORRECTION

PATENT NO. : RE 37,957 E
DATED : January 7, 2003
INVENTOR(S) : Garfield

It is certified that error appears in the above-identified patent and that said Letters Patent is hereby corrected as shown below:

Column 12,
Line 10, “socery” should be -- sorcery --;
Line 43, “a” should be -- an --;
Line 43, “create” should be -- creature --;

Column 13,
Line 38, insert -- the -- between “from” and “library”;
Line 45, insert -- card -- between “top” and “of”;
Line 51, insert -- are either -- between “and” and “rare”;

Column 15,
Line 21, insert -- the -- between “of” and “library”;
Line 23, “winds” should be -- wins --;
Line 33, “not” should be -- now --;
Line 64, “when” should be -- with --;

Column 16,
Line 18, “effect” should be -- effects --;

Column 18,
Line 15, “creature” should be -- creatures --;
Line 47, “means” should be -- mana --;

Column 19,
Line 14, “intentions” should be -- interruptions --;

Column 22,
Line 37, “execution” should be -- executing --;

Column 24,
Line 11, delete “the” between “wherein” and “designating”;
Line 16, insert -- of -- between “library” and “game”;

Column 25,
Line 5, insert -- of -- between “library” and “game”;
Line 41, “on” should be -- by --;
Line 53, “of” should be -- for --;
Line 60, delete “the” between “using” and “one”;

UNITED STATES PATENT AND TRADEMARK OFFICE

CERTIFICATE OF CORRECTION

PATENT NO. : RE 37,957 E
DATED : January 7, 2003
INVENTOR(S) : Garfield

It is certified that error appears in the above-identified patent and that said Letters Patent is hereby corrected as shown below:

Column 26,
Line 37, delete “and” between “play” and “for”;
Line 46, “play” should be -- player --;

Column 27,
Line 43, “card” should be -- cards --;

Column 28,
Line 13, insert -- the -- between “of” and “game”;

Signed and Sealed this

Thirteenth Day of July, 2004

JON W. DUDAS
*Acting Director of the United States Patent and Trademark Office*